UNITED STATES PATENT OFFICE.

HUGO GELDERMANN, OF GROSS-LICHTERFELDE-OST, BERLIN, GERMANY, ASSIGNOR TO ACTIEN GESELLSCHAFT FÜR ANILIN FABRIKATION, OF BERLIN, GERMANY.

MONOAZO DYESTUFF AND PROCESS OF MAKING SAME.

984,900.     Specification of Letters Patent.     Patented Feb. 21, 1911.

No Drawing.     Application filed April 18, 1910. Serial No. 556,201.

*To all whom it may concern:*

Be it known that I, HUGO GELDERMANN, a subject of the German Emperor, residing at Gross - Lichterfelde - Ost, Berlin, Germany, (my post-office address being Grabenstrasse 12, Gross-Lichterfelde-Ost, Berlin), have invented certain new and useful Improvements in New Monoazo Dyestuff and Processes of Making the Same, of which the following is a specification.

My present invention relates to improvements in the manufacture of yellow monoazo dyestuffs for wool and is based on the observation that by diazotizing para-chloranilin-meta-sulfonic acid and combining the diazo-compound thus prepared with 1-phenyl-3-methyl-5-pyrazolon a very valuable dyestuff is obtained, which new coloring matter dyes wool from an acid bath containing sulfuric acid clear and intense yellow tints of a good fastness which are more especially very fast to light.

The following example serves to illustrate my invention, the parts being by weight:

Example: 20.7 parts of para-chloranilin-meta-sulfonic acid ($NH_4 : Cl : SO_3H = 1 : 4 : 3$) are diazotized in the usual manner by means of 7 parts of sodium nitrite and of 30 parts of concentrated hydrochloric acid (20–22° Bé. specific gravity). The diazo solution thus obtained is allowed to run into a solution of 1-phenyl-3-methyl-5-pyrazolon which is prepared by dissolving 18 parts of this body in water by means of the calculated proportion of soda-lye and which solution is added with such a quantity of sodium carbonate as to warrant alkaline reaction to the end of the reaction. The combination being finished, the separation of the dyestuff is completed by adding common salt, the product is then isolated by draining, pressing and drying. It produces on wool from an acid bath clear and intense yellow tints which are more especially very fast to light. The new dyestuff thus obtained represents in the dry state when pulverized a reddish yellow powder which dissolves in water to a yellow solution; this aqueous solution on the addition of concentrated hydrochloric acid separates the free acid of the dyestuff as yellow flakes and on the addition of concentrated soda-lye shows a gelatin-like yellow separation. In alcohol the new coloring matter dissolves to a yellow solution and in concentrated sulfuric acid to a greenish-yellow solution which on adding ice is partially precipitated yellow flakes being separated. Furthermore the neutral aqueous solution of the dyestuff when boiled with zinc-dust is decolorized and the solution thus obtained assumes on exposure to air a violet coloration. By the action of strong reducing agents, for instance stannous chlorid and hydrochloric acid, the coloring-matter is split up yielding para-chloranilin-meta-sulfonic acid besides amino-1-phenyl-3-methyl-5-pyrazolon.

It is obvious to those skilled in the art that my present invention is not limited to the foregoing example or to the details given therein.

Having now described my invention and the manner in which it may be performed what I claim is,—

As a new article of manufacture the new monoazo - dyestuff which may be obtained by diazotizing para-chloranilin-meta-sulfonic acid and combining the diazo - compound thus obtained with 1-phenyl-3-methyl-5-pyrazolon, which new dyestuff produces on wool from an acid bath clear and intense yellow tints of a good fastness which are more especially very fast to light, this new dyestuff forming in the dry state when pulverized a reddish-yellow powder which is soluble in water to a yellow solution, which solution on the addition of concentrated hydrochloric acid separates the free acid as yellow flakes and which solution on the addition of concentrated soda-lye shows a gelatin-like yellow separation, this new dyestuff being soluble in alcohol to a yellow solution and in concentrated sulfuric acid to a greenish-yellow solution which when added with ice is partially precipitated, yellow flakes being separated, and the neutral aqueous solution of this new dyestuff when boiled with zinc-dust being decolorized, which decolorized solution on exposure to air assumes a violet coloration, this new dyestuff being split up by the action of strong reducing agents (stannous chlorid and hydrochloric acid), thus yielding parachloranilin - meta - sulfonic acid besides amino-1-phenyl-3-methyl-5-pyrazolon.

In testimony whereof I have hereunto set my hand in presence of two subscribing witnesses.

HUGO GELDERMANN.

Witnesses:
 WOLDEMAR HAUPT,
 HENRY HASPER.